US011273733B2

(12) United States Patent
Jung et al.

(10) Patent No.: US 11,273,733 B2
(45) Date of Patent: Mar. 15, 2022

(54) RELAXATION COMFORT SEAT FOR VEHICLE

(71) Applicants: Hyundai Motor Company, Seoul (KR); Kia Motors Corporation, Seoul (KR)

(72) Inventors: Chan Ho Jung, Gyeonggi-do (KR); Bong Ku Kim, Seoul (KR); Seon Chae Na, Gyeonggi-do (KR); Hyeok Seung Lee, Seoul (KR); Ju Yeol Kong, Gyeonggi-do (KR); Jae Wook Kim, Ulsan (KR); Jung Sang You, Gyeonggi-do (KR); Ho Suk Jung, Gyeonggi-do (KP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/989,456

(22) Filed: Aug. 10, 2020

(65) Prior Publication Data

US 2021/0309128 A1 Oct. 7, 2021

(30) Foreign Application Priority Data

Apr. 2, 2020 (KR) ........................ 10-2020-0040038

(51) Int. Cl.
*B60N 2/18* (2006.01)
*B60N 2/02* (2006.01)

(52) U.S. Cl.
CPC ......... *B60N 2/1803* (2013.01); *B60N 2/0232* (2013.01); *B60N 2/1853* (2013.01); *B60N 2002/024* (2013.01); *B60N 2002/0236* (2013.01)

(58) Field of Classification Search
CPC .. B60N 2/1803; B60N 2/0232; B60N 2/1853; B60N 2002/0236; B60N 2002/024; B60N 2/1635; B60N 2/164; B60N 2/1695
See application file for complete search history.

(56) References Cited

U.S. PATENT DOCUMENTS

| 7,240,965 | B2 * | 7/2007 | Messerschmidt | ........ | B60N 2/06 |
| | | | | | 297/344.15 |
| 7,631,939 | B2 * | 12/2009 | Wulf | .................... | B60N 2/0232 |
| | | | | | 297/330 |
| 8,888,181 | B2 | 11/2014 | Perraut et al. | | |
| 10,596,928 | B2 * | 3/2020 | Pleskot | .................... | B60N 2/12 |
| 11,040,640 | B2 * | 6/2021 | Abe | .................... | B60N 2/1695 |
| 2002/0121803 | A1 | 9/2002 | Schooler | | |
| 2006/0169863 | A1 | 8/2006 | Ohtsubo et al. | | |
| 2010/0314927 | A1 * | 12/2010 | McCulloch | .......... | B60N 2/1839 |
| | | | | | 297/313 |

(Continued)

FOREIGN PATENT DOCUMENTS

JP 2017-019441 A 1/2017
KR 10-2019-0111312 A 10/2019

*Primary Examiner* — Philip F Gabler
(74) *Attorney, Agent, or Firm* — Mintz Levin Cohn Ferris Glovsky and Popeo, P.C.; Peter F. Corless

(57) ABSTRACT

A relaxation comfort seat for a vehicle is equipped with a mechanism for realizing a relaxation comfort mode to enable an occupant to take a relaxed comfortable posture for providing comfort and stability to the occupant. In addition, even in a state in which a height of the seat is increased according to a body shape of the occupant, it is possible to easily realize the relaxation comfort mode of the seat.

10 Claims, 8 Drawing Sheets

(56) References Cited

U.S. PATENT DOCUMENTS

| | | | |
|---|---|---|---|
| 2012/0212015 A1* | 8/2012 | Ozawa | B60N 2/165 |
| | | | 297/216.1 |
| 2015/0375647 A1* | 12/2015 | Behrens | B60N 2/1695 |
| | | | 297/325 |
| 2021/0170918 A1* | 6/2021 | Kim | B60N 2/3011 |

* cited by examiner

RELAXATION COMFORT SEAT FOR VEHICLE

CROSS-REFERENCE TO RELATED APPLICATION

This application claims under 35 U.S.C. § 119(a) the benefit of Korean Patent Application No. 10-2020-0040038 filed on Apr. 2, 2020, the entire contents of which are incorporated herein by reference.

BACKGROUND

(a) Technical Field

The present disclosure relates to a relaxation comfort seat for a vehicle, more particularly, to the relaxation comfort seat that enables an occupant to take a relaxed comfortable posture like a posture taken in a weightless state.

(b) Description of the Related Art

In general, a seat for a vehicle includes a seat cushion for supporting the lower part of an occupant's body, a seatback for supporting the upper part of an occupant's body, and a headrest for supporting the neck and the head of an occupant. In addition to these essential components of these at, various seat-adjusting devices and convenience devices may be installed in the interior and exterior of the seat. However, there is further need for a seat mechanism enabling an occupant to freely change the posture according to the body shape and the situation.

Further, in the case of a seat of an autonomous vehicle to be released in the future, it is a requirement to provide a seat mechanism thereto to enable an occupant to take a relaxed comfortable posture for relaxation or sleep during long-distance travel.

For reference, the relaxed comfortable posture refers to a posture that allows an occupant seated in a seat to feel comfortable and stable in a state in which body pressure is distributed to the maximum extent as if the occupant were seated in a weightless state.

For example, as shown in FIG. 8, the relaxed comfortable posture may be realized by adjusting the seated posture of an occupant seated in a seat such that an angle at which the lower part of the occupant's body is supported ranges from 28 to 32 degrees, the angle between the upper part of the occupant's body and the lower part of the occupant's body ranges from 105 to 120 degrees, and the angle at which the upper part of the occupant's body is supported ranges from 32 to 47 degrees.

The above information disclosed in this Background section is only for enhancement of understanding of the background of the disclosure, and therefore it may contain information that does not form the related art that is already known in this country to a person of ordinary skill in the art.

SUMMARY

The present disclosure provides a relaxation comfort seat for a vehicle equipped with a mechanism for realizing a relaxation comfort mode to enable an occupant to take a relaxed comfortable posture like a posture taken in a weightless state.

The present disclosure also provides a relaxation comfort seat for a vehicle that is easily adjusted to a relaxation comfort mode even in the state in which the height of the seat is increased.

In one aspect, the present disclosure provides a relaxation comfort seat for a vehicle, including a seat cushion side frame having a height adjustment guide hole formed in a front end portion of the seat cushion side frame, a lead screw guide bracket mounted to the front end portion of the seat cushion side frame, a first fixing bracket mounted to the front end portion of a seat rail, a first motor rotatably mounted to the first fixing bracket, a lead screw inserted into the first motor so as to be linearly movable and rotatably coupled at an upper end portion of the lead screw to the lead screw guide bracket, a first height link disposed such that one end portion of the first height link is rotatably coupled to the first fixing bracket and the opposite end portion of the first height link is movably coupled to the height adjustment guide hole in the seat cushion side frame, a relaxation guide link disposed such that one end portion of the relaxation guide link is rotatably coupled to a first connection pipe connected to the front end portion of the seat cushion side frame and the opposite end portion of the relaxation guide link is rotatably coupled to the opposite end portion of the first height link while overlapping the opposite end portion of the first height link, a second fixing bracket mounted to the rear end portion of the seat rail, and a second height link disposed such that one end portion of the second height link is rotatably coupled to the second fixing bracket and the opposite end portion of the second height link is coupled to a second connection pipe connected to the rear end portion of the seat cushion side frame.

In a preferred embodiment, the height adjustment guide hole in the seat cushion side frame may be formed so as to be inclined upwards from a front side of the seat cushion side frame to a rear side of the seat cushion side frame.

In another preferred embodiment, a first rotation point at which one end portion of the first height link is rotatably coupled to an outer surface of the first fixing bracket and a second rotation point at which the first motor is rotatably coupled to an inner surface of the first fixing bracket may be located on the same axis.

In still another preferred embodiment, the relaxation comfort seat may further include a motor-mounting bracket mounted to an inner surface of the first fixing bracket, and the front end portion of a gearbox of the first motor may be rotatably coupled to the motor-mounting bracket via a hinge pin.

In yet another preferred embodiment, the lead screw guide bracket may have a structure providing a space to allow the first height link and the relaxation guide link to be inserted into the lead screw guide bracket, and may be fixedly mounted to an inner surface of the front end portion of the seat cushion side frame.

In still yet another preferred embodiment, the upper end portion of the lead screw may be rotatably coupled to an inner surface of the lead screw guide bracket via a hinge pin.

In a further preferred embodiment, the first height link may be provided at an opposite end portion of the first height link with a guide pin configured to move along the height adjustment guide hole in the seat cushion side frame.

In another further preferred embodiment, the first fixing bracket and the second fixing bracket may be mounted to a moving rail of the seat rail.

In still another further preferred embodiment, a second motor for applying rotational force to the second height link may be mounted to the rear end portion of the seat cushion side frame in order to adjust the height of a rear portion of a seat cushion, an output gear may be mounted to an output shaft of the second motor, and a sector gear may be formed at the second height link so as to be engaged with the output gear.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein:

FIG. 1 is a perspective view showing the state before the front end portion of a seat cushion side frame ascends, and FIG. 2 is a perspective view showing the state in which the front end portion of the seat cushion side frame ascends;

Figure 1:
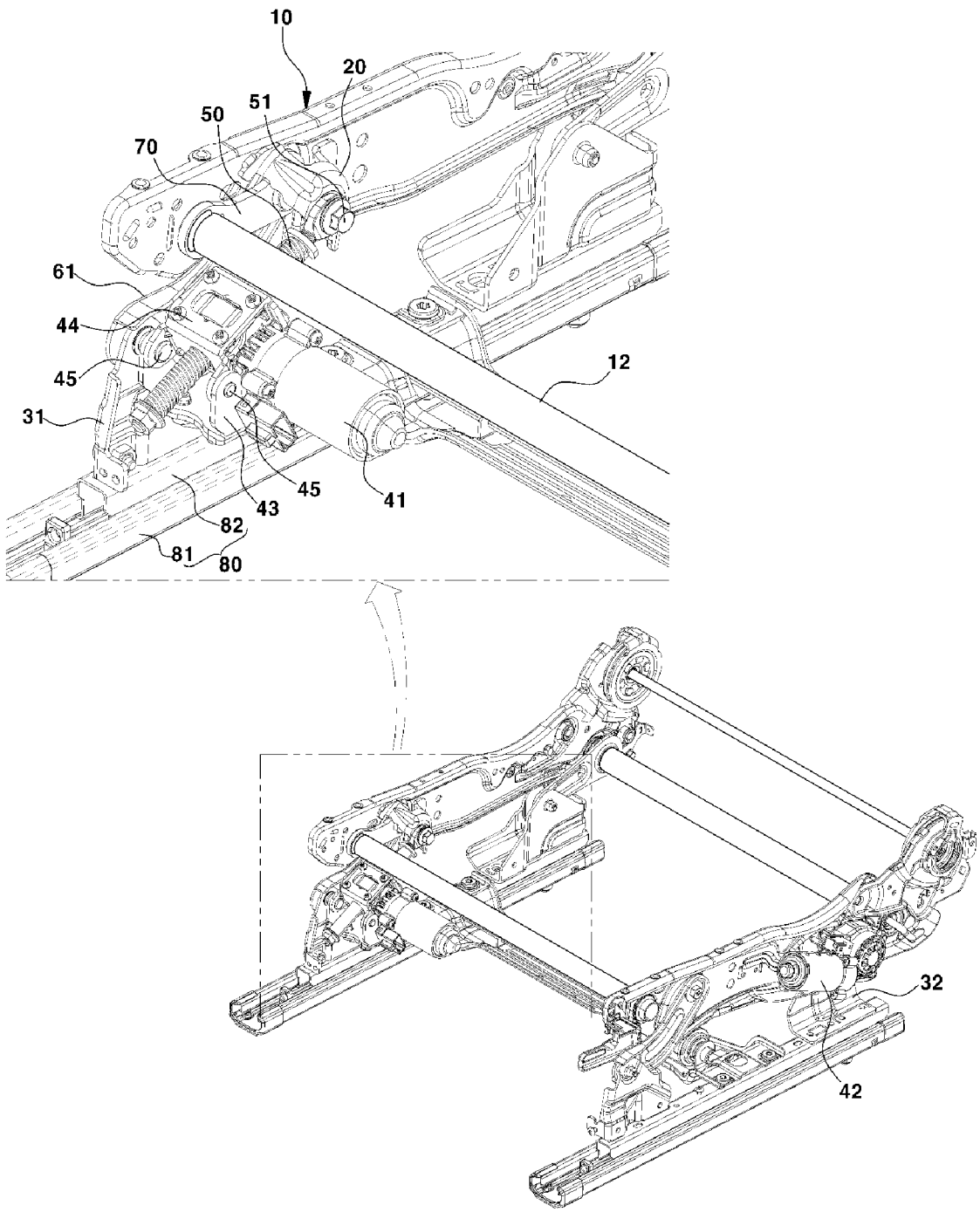
FIGS. 1 and 2 are enlarged views of the front portion of a relaxation comfort seat for a vehicle according to the present disclosure, where

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

Figure 2:
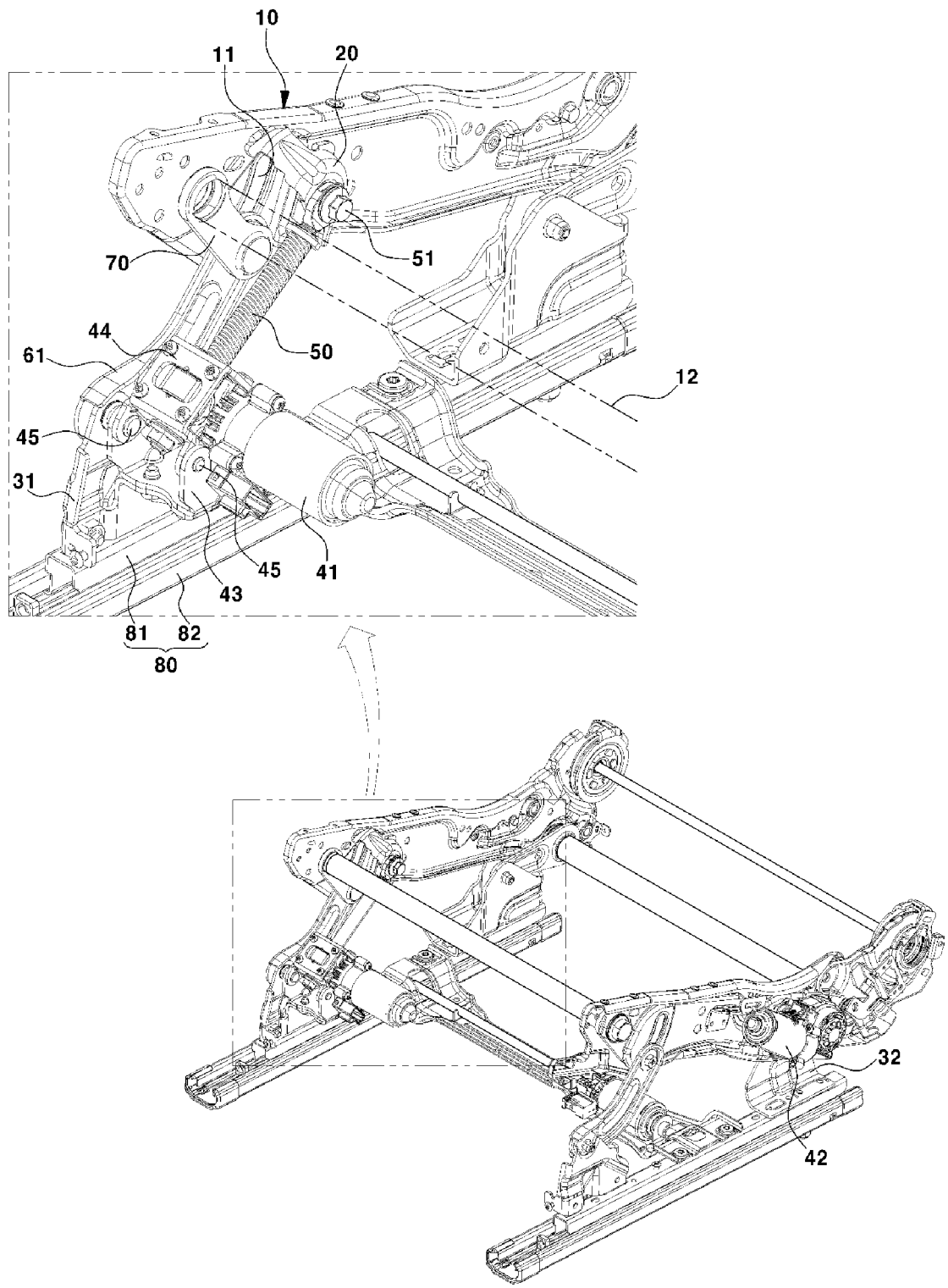
Figure 3:
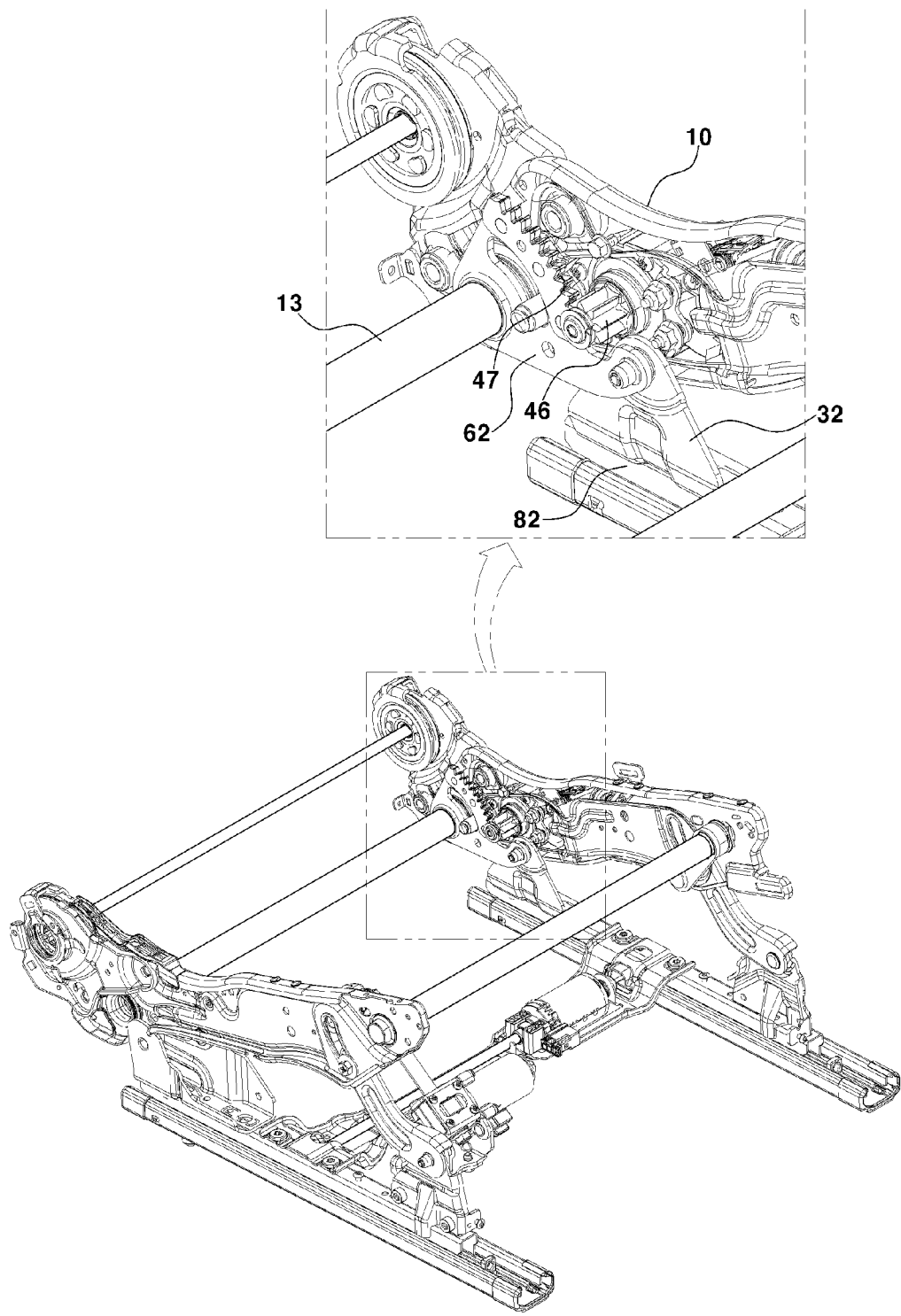
FIG. 3 is an enlarged perspective view of the rear portion of the relaxation comfort seat for a vehicle according to the present disclosure.

FIGS. 1 to 3 are perspective views showing a relaxation comfort seat for a vehicle according to the present disclosure. Reference numeral 10 denotes a seat cushion side frame.

The seat cushion side frame 10 preferably is provided in pairs that have the same shape and are disposed at left and right sides.

Figure 4A:
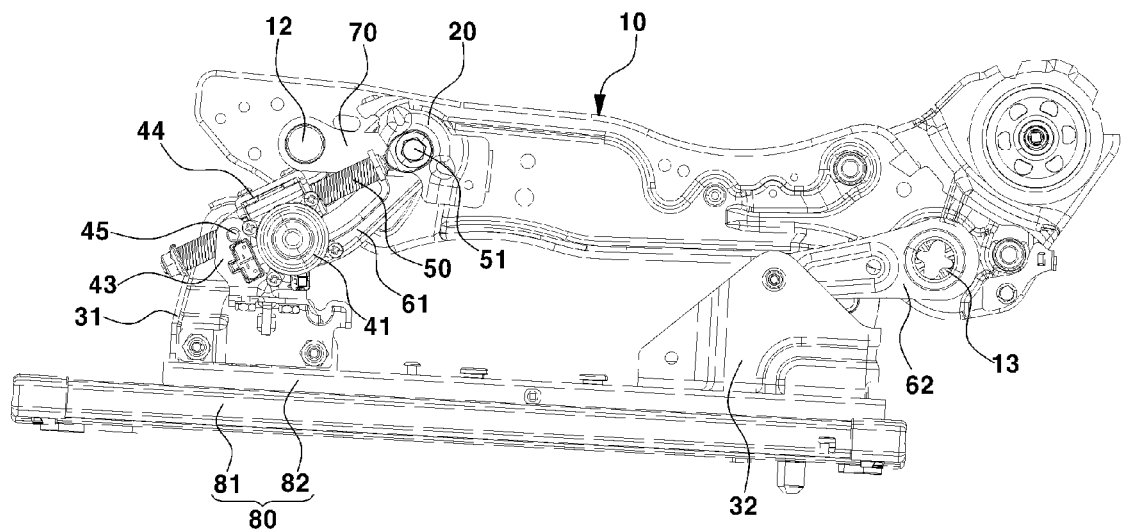
FIGS. 4A and 4B are side views showing the basic mode (the initial position) of the relaxation comfort seat for a vehicle according to the present disclosure.
Figure 4B:
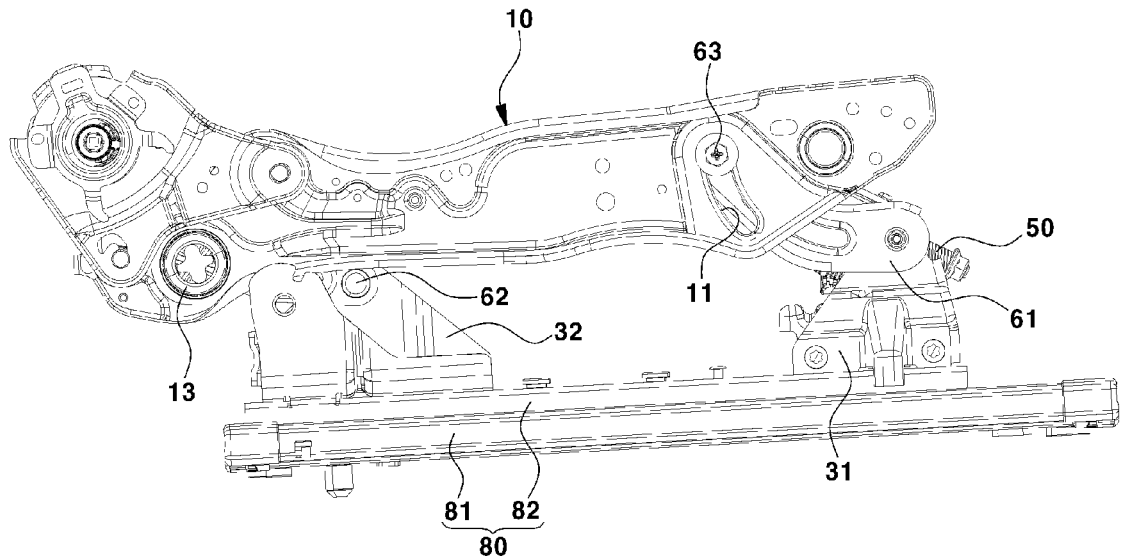

As shown in FIG. 4B, the seat cushion side frame 10 has a height adjustment guide hole 11 formed through the front end portion of the seat cushion side frame 10.

Preferably, the height adjustment guide hole 11 is formed in a shape that is inclined upwards from the front side of the height adjustment guide hole 11 to the rear side of the height adjustment guide hole 11 in consideration of the path along which the front end portion of the seat cushion side frame 10 ascends.

A lead screw guide bracket 20 is fixedly mounted to the inner surface of the front end portion of the seat cushion side frame 10.

Preferably, the lead screw guide bracket 20 has a structure that is bent to provide a space into which one end portion of a first height link 61 and one end portion of a relaxation guide link 70, which will be described later, are capable of being inserted, and is fixedly mounted to the inner surface of the front end portion of the seat cushion side frame 10.

In addition, a first fixing bracket 31 is mounted to the front end portion of a seat rail 80, which is mounted on a floor panel provided in the interior of the vehicle.

Preferably, the seat rail 80 is composed of a fixed rail 81, fixedly mounted on the floor panel, and a moving rail 82, coupled onto the fixed rail 81 so as to be movable forwards and backwards. In order to adjust the position of the seat in the forward-backward direction, the first fixing bracket 31 is mounted onto the moving rail 82.

A first motor 41 is rotatably mounted to the inner surface of the first fixing bracket 31 in order to provide rotational force for realizing a relaxation comfort mode.

Preferably, a motor-mounting bracket 43 is mounted to the inner surface of the first fixing bracket 31, and the front end portion of a gear box 44 of the first motor 41 is rotatably coupled to the motor-mounting bracket 43 via a hinge pin 45.

A lead screw 50 having a predetermined length is inserted into the gearbox 44 of the first motor 41 so as to be linearly movable, and the upper end portion of the lead screw 50 is rotatably coupled to the inner surface of the lead screw guide bracket 20.

Preferably, the upper end portion of the lead screw 50 is rotatably coupled to the inner surface of the lead screw guide bracket 20 via a hinge pin 51.

A first height link 61 is connected to the height adjustment guide hole 11 in the seat cushion side frame 10 and the first fixing bracket 31 while being interposed there between.

In particular, the front end portion of the first height link 61 is rotatably coupled to the outer surface of the first fixing bracket 31, and the rear end portion of the first height link 61 is movably fitted in the height adjustment guide hole 11 in the seat cushion side frame 10.

Preferably, as shown in FIG. 4B, a guide pin 63 is mounted to the rear end portion of the first height link 61. The guide pin 63 is inserted into the height adjustment guide hole 11 in the seat cushion side frame 10 so as to be prevented from being separated therefrom.

Accordingly, when the first height link 61 is erected, the guide pin 63 moves to the lower side of the height adjustment guide hole 11. When the first height link 61 is laid down, the guide pin 63 moves to the upper side of the height adjustment guide hole 11.

A first rotation point at which the front end portion of the first height link 61 is rotatably coupled to the outer surface of the first fixing bracket 31 and a second rotation point at which the first motor 41 is rotatably coupled to the inner surface of the first fixing bracket 31 (substantially, the first rotation point at which the front end portion of the gearbox 44 of the first motor 41 is rotatably coupled to the motor-mounting bracket 43 via the hinge pin 45) need to be located on the same axis in the leftward-rightward direction.

In this case, when the lead screw 50 of the first motor 41 ascends while moving backwards, and at the same time, the front end portion of the seat cushion side frame 10 is pushed and ascends, the first height link 61 is rotated so as to be erected. At this time, in order to prevent damage to the lead screw 50 and the first motor 41, the lead screw 50 and the first motor 41 need to be rotated to an angle that is the same as the angle to which the first height link 61 is rotated so as to be erected.

A device for erecting the first height link 61 when the front end portion of the seat cushion side frame 10 ascends or for laying the first height link 61 down when the front end portion of the seat cushion side frame 10 descends is required.

To this end, a relaxation guide link 70 is connected to the front end portion of the seat cushion side frame 10, i.e. the portion of the seat cushion side frame 10 that is located ahead of the height adjustment guide hole 11, and the opposite end portion of the first height link 61, i.e. the portion of the first height link 61 that is movably fitted into the height adjustment guide hole 11, while being interposed there between.

In particular, one end portion of the relaxation guide link 70 is rotatably coupled to a first connection pipe 12, which is connected to the front end portions of the pair of seat cushion side frames 10 while being interposed there between, and the opposite end portion of the relaxation guide link 70 is rotatably coupled to the opposite end portion of the first height link 61 while overlapping the opposite end portion of the first height link 61.

Thus, when the lead screw 50 of the first motor 41 moves backwards, it pushes the front end portion of the seat cushion side frame 10 upwards. Accordingly, when the front end portion of the seat cushion side frame 10 ascends, the opposite end portion of the relaxation guide link 70 rotates downwards about one end portion of the seat cushion side frame 10, which is coupled to the first connection pipe 12, and pulls the opposite end portion of the first height link 61 downwards.

Subsequently, when the opposite end portion of the relaxation guide link 70 pulls the opposite end portion of the first height link 61 downwards, the guide pin 63 of the first height link 61 moves to the lower side of the height adjustment guide hole 11 in the seat cushion side frame 10, and thus the first height link 61 is erected.

Referring to FIG. 3, the second fixing bracket 32 is mounted to the rear end portion of the seat rail 80. As described above, in order to adjust the position of the seat in the forward-backward direction, the second fixing bracket 32 is mounted onto the moving rail 82.

In addition, a second height link 62 is connected to the second fixing bracket 32 and the second connection pipe 13, which is connected to the rear end portion of the seat cushion side frame 10, while being interposed there between.

Preferably, one end portion of the second height link 62 is rotatably coupled to the upper end portion of the second fixing bracket 32, and the opposite end portion of the second height link 62 is fixedly coupled to the second connection pipe 13, which is connected to the rear end portion of the seat cushion side frame 10.

In this case, as shown in FIGS. 1 and 2, a second motor 42 for applying rotational force to the second height link 62 is mounted to the outer surface of the rear end portion of the seat cushion side frame 10 in order to adjust the height of the rear portion of the seat cushion.

Preferably, an output gear 46 is mounted to the output shaft of the second motor 42, and a sector gear 47, which is engaged with the output gear 46, is formed on the second height link 62.

Accordingly, when the rotational force of the output gear 46 that is generated by driving the second motor 42 is transmitted to the sector gear 47, the second height link 62 is erected, and at the same time, the rear end portion of the seat cushion side frame 10, which is connected to the second height link 62 via the second connection pipe 13, ascends.

Hereinafter, the operation of the relaxation comfort seat for a vehicle according to the present disclosure having the above-described configuration will be described.

FIGS. 4A and 4B are side views showing the basic mode (the initial position) of the relaxation comfort seat for a vehicle according to the present disclosure before the relaxation comfort seat is adjusted to the relaxation comfort mode.

As shown in FIG. 4A, in the basic mode (the initial position) of the relaxation comfort seat, the lead screw 50 of the first motor 41 is in the state of having been lowered to the maximum extent in the forward direction, and the first and second height links 61 and 62 are in the state of lying down to the maximum extent. As shown in FIG. 4B, the guide pin 63 of the first height link 61 is in the state of being located at the top of the height adjustment guide hole 11 in the seat cushion side frame 10.

Figure 5A:
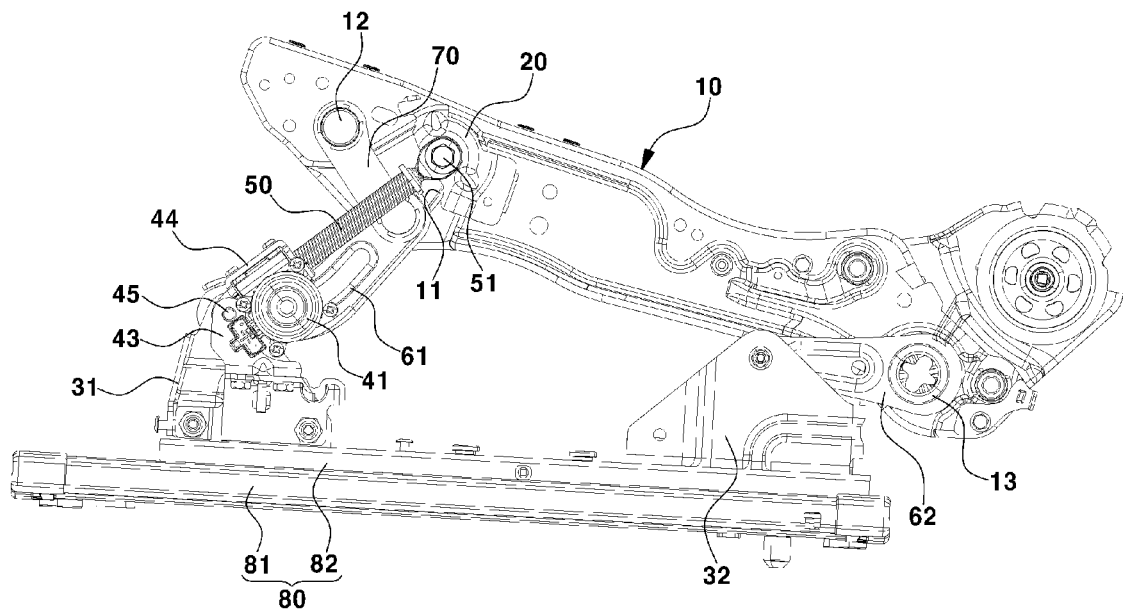
FIGS. 5A and 5B are side views showing the state in which the relaxation comfort seat for a vehicle according to the present disclosure is adjusted to the relaxation comfort mode.
Figure 5B:
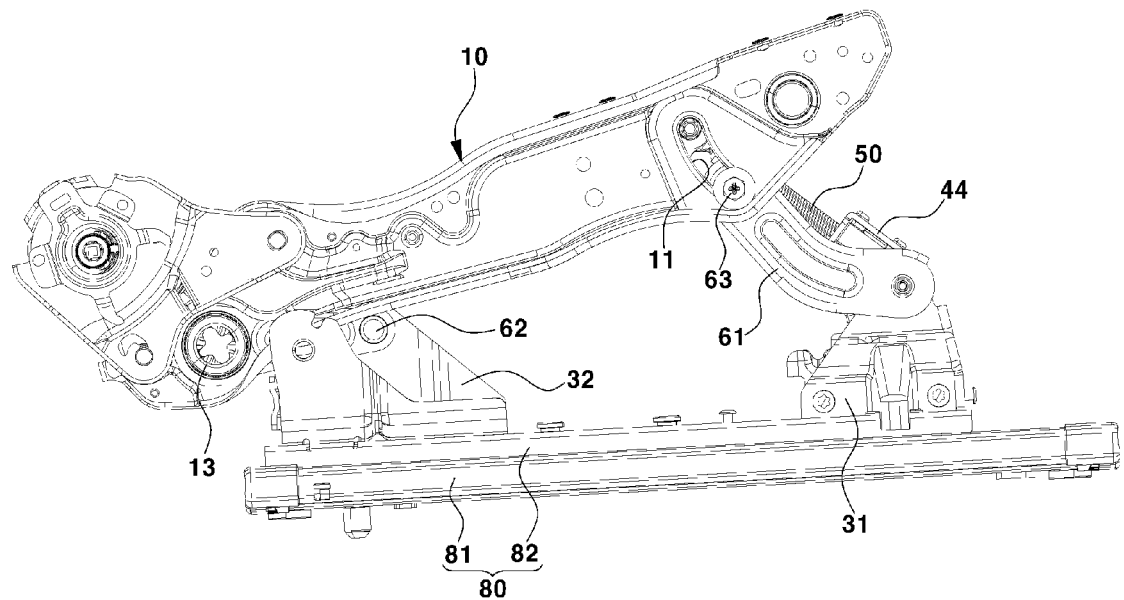

FIGS. 5A and 5B show the relaxation comfort mode to which the relaxation comfort seat for a vehicle according to the present disclosure is adjusted from the basic mode.

First, in order to realize the relaxation comfort mode, the first motor 41 is driven, and the rotational force generated thereby is transmitted to the lead screw 50 through the gearbox 44. The lead screw 50 is moved backwards while rotating in place.

Subsequently, the lead screw 50 moves backwards to the maximum extent, and simultaneously pushes the front end portion of the seat cushion side frame 10 upwards. Thereby, the front end portion of the seat cushion side frame 10 ascends.

At the same time, the opposite end portion of the relaxation guide link 70 rotates downwards about one end portion of the seat cushion side frame 10 coupled to the first connection pipe 12, and pulls the opposite end portion of the first height link 61 downwards.

Accordingly, as shown in FIG. 5A, the front end portion of the seat cushion side frame 10 ascends, and at the same time, the first height link 61 is erected. As shown in FIG. 5B, the guide pin 63 of the first height link 61 is located at the bottom of the height adjustment guide hole 11 in the seat cushion side frame 10.

At this time, the second height link 62 rotates so as to be inclined further backwards about the portion of the second height link 62 that is coupled to the upper end portion of the second fixing bracket 32, and the rear end portion of the seat cushion side frame 10, which is connected to the second height link 62 via the second connection pipe 13, descends further. Although not shown, the seatback may be inclined further backwards.

As such, the front end portion of the seat cushion side frame 10 ascends, and at the same time, the rear end portion of the seat cushion side frame 10 descends, thereby realizing the relaxation comfort mode of the seat.

Figure 8:
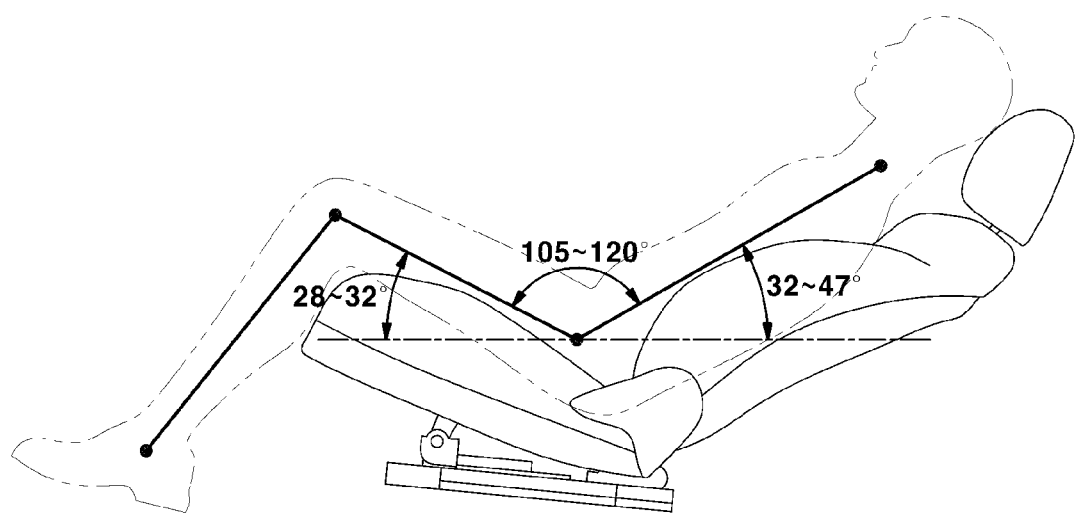
FIG. 8 is a view schematically showing the relaxed comfortable posture of an occupant seated in a seat.

For example, as shown in FIG. 8, the relaxation comfort mode is a mode in which the body of an occupant seated in the seat is supported such that the angle at which the lower body part is supported ranges from 28 to 32 degrees, the angle between the upper body part and the lower body part ranges from 105 to 120 degrees, and the angle at which the upper body part is supported ranges from 32 to 47 degrees.

As such, since the relaxation comfort mode of the seat is realized, an occupant may feel comfortable and stable and may be less fatigued in the state in which body pressure of the occupant is distributed to the maximum extent as if the occupant were seated in a weightless state.

Meanwhile, even when the size of the lower part of the occupant's body is equal to or larger than the size of the upper part of the occupant's body, the occupant is capable of taking a relaxed comfortable posture by increasing the height of the seat cushion. To this end, the height of the seat cushion side frame 10 may be maximally increased.

Figure 6A:
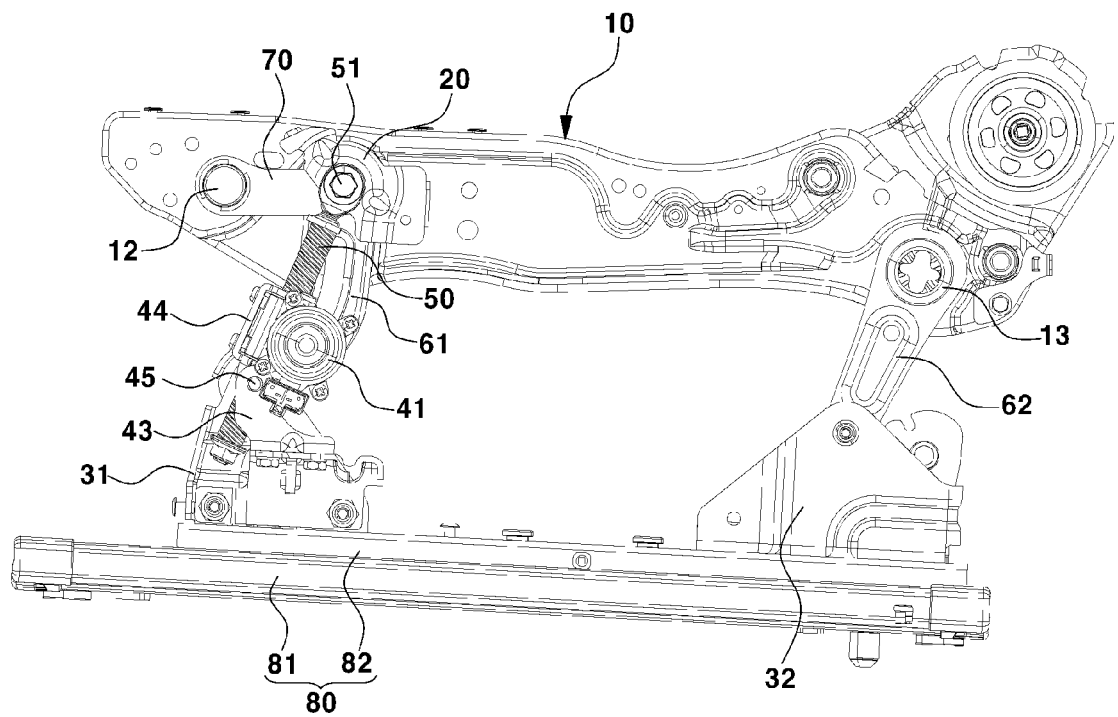
FIGS. 6A and 6B are side views showing the state in which the height of the relaxation comfort seat for a vehicle according to the present disclosure is increased to the maximum extent.
Figure 6B:
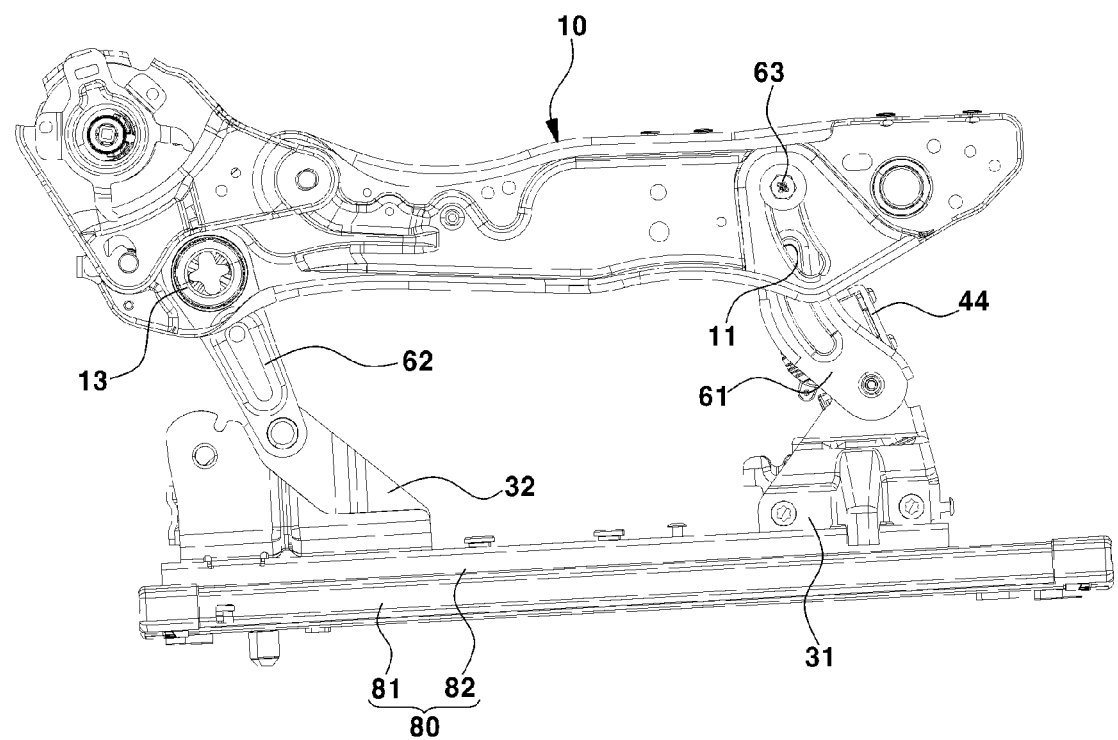

FIGS. 6A and 6B show the state in which the height of the relaxation comfort seat for a vehicle according to the present disclosure is maximally increased.

In order to maximally increase the height of the relaxation comfort seat, the second motor 42, which is mounted to the outer surface of the rear end portion of the seat cushion side frame 10, is driven, and the rotational force of the output gear 46 generated thereby is transmitted to the sector gear 47 of the second height link 62. Subsequently, as shown in FIGS. 6A and 6B, the second height link 62 is erected, and at the same time, the rear end portion of the seat cushion side frame 10, which is connected to the second height link 62 via the second connection pipe 13, is rotated forwards and ascends.

In addition, as the rear end portion of the seat cushion side frame 10 is rotated forwards and ascends, the front end portion of the seat cushion side frame 10 is also rotated forwards and ascends.

At this time, as the first motor 41 rotates about the hinge-coupling point, at which it is coupled to the first fixing bracket 31 via the motor-mounting bracket, the lead screw 50 is maximally erected. The lead screw 50 is maximally erected while rotating about the hinge-coupling point, at which it is coupled to the first fixing bracket 31 via the first height link 61.

After the height of the seat is maximally increased in this manner, the above-described relaxation comfort mode of the seat may be realized.

Figure 7A:
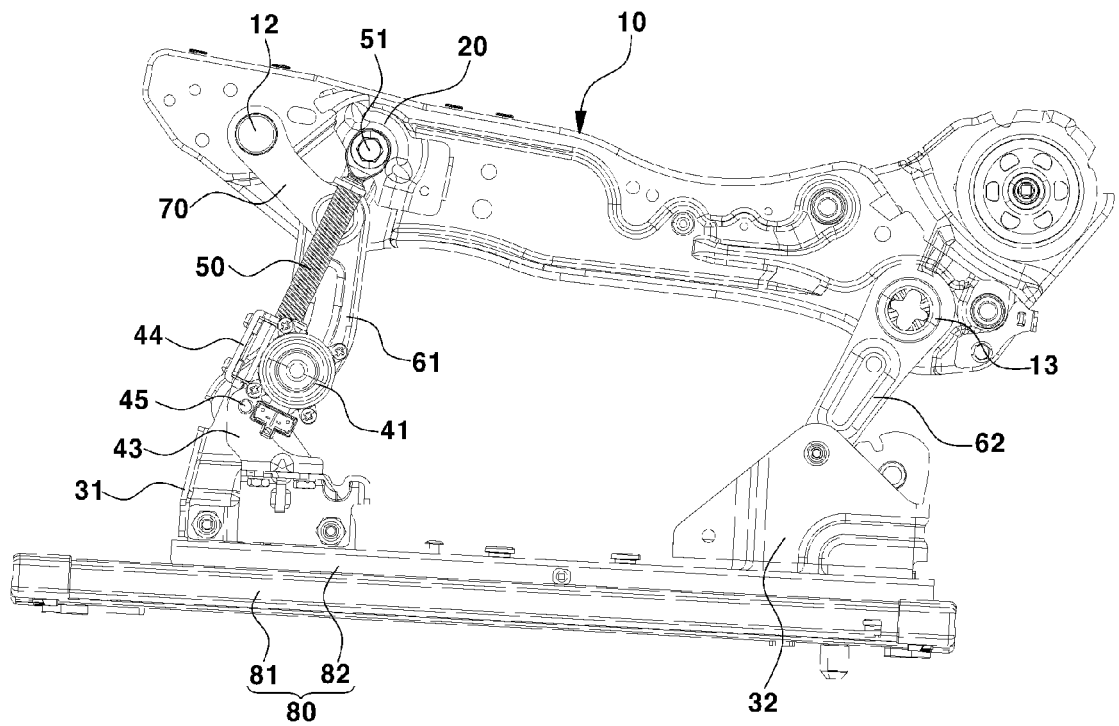
FIGS. 7A and 7B are side views showing the relaxation comfort mode to which the relaxation comfort seat for a vehicle according to the present disclosure is adjusted after being maximally increased in height.
Figure 7B:
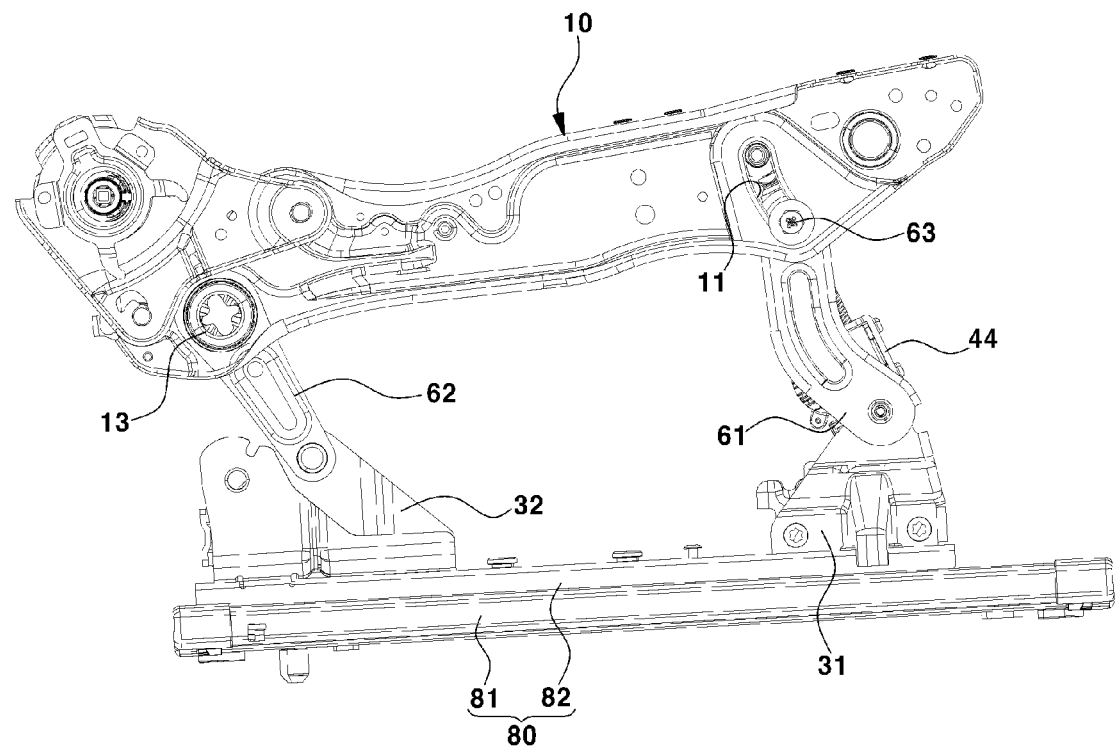

FIGS. 7A and 7B show the relaxation comfort mode to which the relaxation comfort seat for a vehicle according to the present disclosure is adjusted after being maximally increased in height.

In order to make the relaxation comfort seat enter the relaxation comfort mode after the height of the relaxation comfort seat is maximally increased, the first motor 41 is driven, and the rotational force of the first motor 41 is transmitted to the lead screw 50 through the gearbox 44. The lead screw 50 rotates in place and ascends while moving backwards.

Simultaneously with the maximal ascent of the relaxation comfort seat in the backward direction, the lead screw 50 pushes the front end portion of the seat cushion side frame 10 upwards. Thereby, the front end portion of the seat cushion side frame 10 ascends.

At the same time, the opposite end portion of the relaxation guide link 70 rotates downwards about one end portion of the relaxation guide link 70, which is coupled to the first connection pipe 12. As shown in FIG. 7A, the opposite end portion of the first height link 61 is pulled downwards.

At this time, as shown in FIG. 5B, the guide pin 63 of the first height link 61 is moved to the bottom of the height adjustment guide hole 11 in the seat cushion side frame 10.

After the overall height of the seat cushion side frame 10 is increased, the front end portion of the seat cushion side frame 10 ascends, thereby realizing the relaxation comfort mode of the seat.

As described above, even in the state in which the height of the seat is increased according to the body shape of an occupant, it is possible to easily realize the relaxation comfort mode of the seat.

As is apparent from the above description, the present disclosure having the above configuration has the following effects.

First, owing to the mechanism for realizing the relaxation comfort mode of a seat, an occupant may take a relaxed comfortable posture at which the occupant may feel comfortable and stable and may be less fatigued in the state in which body pressure of the occupant is distributed to the maximum extent as if the occupant were seated in a weightless state.

Second, even in a state in which a height of the seat is increased according to a body shape of the occupant, it is possible to easily realize the relaxation comfort mode of the seat.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A relaxation comfort seat for a vehicle, comprising:
   a seat cushion side frame having a height adjustment guide hole formed in a front end portion of the seat cushion side frame;
   a lead screw guide bracket mounted to the front end portion of the seat cushion side frame;
   a first fixing bracket mounted to a front end portion of a seat rail;
   a first motor rotatably mounted to the first fixing bracket;
   a lead screw inserted into the first motor so as to be linearly movable, the lead screw being rotatably coupled at an upper end portion of the lead screw to the lead screw guide bracket;
   a first height link disposed such that one end portion of the first height link is rotatably coupled to the first fixing bracket and an opposite end portion of the first height link is movably coupled to the height adjustment guide hole in the seat cushion side frame;
   a relaxation guide link disposed such that one end portion of the relaxation guide link is rotatably coupled to a first connection pipe connected to a front end portion of the seat cushion side frame and an opposite end portion of the relaxation guide link is rotatably coupled to the opposite end portion of the first height link while overlapping the opposite end portion of the first height link;
   a second fixing bracket mounted to a rear end portion of the seat rail; and
   a second height link disposed such that one end portion of the second height link is rotatably coupled to the second fixing bracket and an opposite end portion of the second height link is coupled to a second connection pipe connected to a rear end portion of the seat cushion side frame.

2. The relaxation comfort seat of claim 1, wherein the height adjustment guide hole in the seat cushion side frame is formed so as to be inclined upwards from a front side of the height adjustment guide hole to a rear side of the height adjustment guide hole.

3. The relaxation comfort seat of claim 1, wherein a first rotation point at which one end portion of the first height link is rotatably coupled to an outer surface of the first fixing bracket and a second rotation point at which the first motor is rotatably coupled to an inner surface of the first fixing bracket are located on a same axis.

4. The relaxation comfort seat of claim 3, further comprising:
   a motor-mounting bracket mounted to an inner surface of the first fixing bracket,
   wherein a front end portion of a gearbox of the first motor is rotatably coupled to the motor-mounting bracket via a hinge pin.

5. The relaxation comfort seat of claim 1, wherein the lead screw guide bracket has a structure providing a space to allow the first height link and the relaxation guide link to be inserted into the lead screw guide bracket, and is fixedly mounted to an inner surface of a front end portion of the seat cushion side frame.

6. The relaxation comfort seat of claim 1, wherein an upper end portion of the lead screw is rotatably coupled to an inner surface of the lead screw guide bracket via a hinge pin.

7. The relaxation comfort seat of claim 1, wherein the first height link is provided at the opposite end portion of the first height link with a guide pin configured to move along the height adjustment guide hole in the seat cushion side frame.

8. The relaxation comfort seat of claim 1, wherein the first fixing bracket and the second fixing bracket are mounted to a moving rail of the seat rail.

9. The relaxation comfort seat of claim 1, further comprising:
   a second motor mounted to a rear end portion of the seat cushion side frame,
   wherein the second motor applies rotational force to the second height link to adjust a height of a rear portion of a seat cushion.

10. The relaxation comfort seat of claim 9, further comprising:
    an output gear mounted to an output shaft of the second motor; and
    a sector gear formed at the second height link so as to be engaged with the output gear.

* * * * *